(12) United States Patent
Peltier et al.

(10) Patent No.: US 9,957,039 B2
(45) Date of Patent: May 1, 2018

(54) SYSTEM FOR OPENING AND CLOSING A GEAR BAY

(71) Applicant: AKKA INGENIERIE PRODUIT, Boulogne Billancourt (FR)

(72) Inventors: Louis Peltier, Blagnac (FR); Robin Allory, Cholet (FR); Maurice Ricci, Brussels (BE)

(73) Assignee: AKKA INGENIERIE PRODUIT, Boulogne Billancourt (FR)

( * ) Notice: Subject to any disclaimer, the term of this patent is extended or adjusted under 35 U.S.C. 154(b) by 393 days.

(21) Appl. No.: 14/920,600

(22) Filed: Oct. 22, 2015

(65) Prior Publication Data

US 2016/0039517 A1    Feb. 11, 2016

Related U.S. Application Data

(63) Continuation of application No. PCT/FR2014/051005, filed on Apr. 25, 2014.

(51) Int. Cl.
*B64C 25/16* (2006.01)
*B64C 25/14* (2006.01)

(52) U.S. Cl.
CPC .............. *B64C 25/16* (2013.01); *B64C 25/14* (2013.01)

(58) Field of Classification Search
CPC .......... B64C 25/16; B64C 25/14; B64C 25/10
See application file for complete search history.

(56) References Cited

U.S. PATENT DOCUMENTS

| | | | | | |
|---|---|---|---|---|---|
| 2,176,461 | A | * | 10/1939 | Larsen | B64C 25/14 244/102 R |
| 2,431,093 | A | * | 11/1947 | Trich | B64C 25/12 244/102 R |
| 2,548,832 | A | * | 4/1951 | Tydon | B64C 25/16 244/101 |
| 2,747,817 | A | * | 5/1956 | Saulnier | B64C 25/50 244/102 R |
| 4,408,736 | A | * | 10/1983 | Kirschbaum | B64C 25/32 244/100 R |
| 7,458,542 | B2 | | 12/2008 | Chow et al. | |

(Continued)

FOREIGN PATENT DOCUMENTS

| | | |
|---|---|---|
| EP | 1564137 A1 | 8/2005 |
| FR | 2 886 620 | 12/2006 |

(Continued)

OTHER PUBLICATIONS

International Search Report dated Jul. 1, 2014 in International Application No. PCT/FR2014/051005.

*Primary Examiner* — Christopher P Ellis
(74) *Attorney, Agent, or Firm* — Brinks Gilson & Lione

(57) ABSTRACT

The present disclosure provides a system for opening and closing, in a substantially longitudinal direction, at least one hatch of a landing gear bay of an aircraft. In particular, the system includes: a proximal guide rod and a distal guide rod, each having a first end pivotably attachable to the hatch, and a second end pivotably attachable to a stationary inner structure of the gear bay, and arranged such as to form a deformable parallelogram hinge; and at least one drive rod having a first end that is pivotably attachable to the hatch, and a second end that is pivotably attachable to a landing gear leg.

11 Claims, 2 Drawing Sheets

(56) References Cited

U.S. PATENT DOCUMENTS

| | | | | |
|---|---|---|---|---|
| 7,651,053 | B2* | 1/2010 | Fort | B64C 7/00 |
| | | | | 244/102 R |
| 8,308,108 | B2* | 11/2012 | Cazals | B64C 1/0009 |
| | | | | 244/102 R |
| 9,290,263 | B2* | 3/2016 | Cook | B64C 25/16 |
| 9,828,086 | B2* | 11/2017 | Cook | B64C 25/14 |
| 2008/0173760 | A1* | 7/2008 | Ponsart | B64C 25/16 |
| | | | | 244/129.5 |
| 2009/0159743 | A1 | 6/2009 | Guering et al. | |
| 2010/0006696 | A1* | 1/2010 | Chow | B64C 25/16 |
| | | | | 244/1 N |
| 2010/0019089 | A1* | 1/2010 | Sibley | B64C 1/1407 |
| | | | | 244/129.5 |
| 2010/0140395 | A1* | 6/2010 | Amberg | B64C 25/16 |
| | | | | 244/102 R |
| 2011/0186680 | A1* | 8/2011 | Ekmedzic | B64C 25/10 |
| | | | | 244/102 R |

FOREIGN PATENT DOCUMENTS

| | | |
|---|---|---|
| FR | 2 911 321 | 7/2008 |
| FR | 2 922 519 | 4/2009 |

\* cited by examiner

SYSTEM FOR OPENING AND CLOSING A GEAR BAY

CROSS-REFERENCE TO RELATED APPLICATIONS

This application is a continuation of International Application No. PCT/FR2014/051005, filed on Apr. 25, 2014, which claims the benefit of FR 13/53783, filed on Apr. 25, 2013. The disclosures of the above applications are incorporated herein by reference.

FIELD

The present disclosure relates to a device for opening and closing a landing gear bay of an aircraft.

BACKGROUND

The statements in this section merely provide background information related to the present disclosure and may not constitute prior art.

A landing gear bay is a housing intended to receive a landing gear of an aircraft.

In most aircraft for transporting merchandise or people, the gear bay is located in the fuselage of the aircraft and is usually closed by an opening and closing system including several hatches.

There are several opening and closing systems.

Typically, an opening and closing system, or hatch system, includes at least two main hatches, for example the front gear hatches, which open for allowing the deployment of the gear and close when the gear is out so as to limit aerodynamic disruptions.

This system also includes at least two secondary hatches, for example the rear gear hatches, which open for allowing the deployment of the gear and remain open as long as the gear is out.

The system may also include a fifth hatch, called central hatch or main leg fairing, which, like the secondary hatches, remains open as long as the gear is out. The main leg fairing is usually secured on the gear, more particularly on a gear leg.

A landing gear hatch, more simply called gear hatch, usually comprises a panel secured on hinge arms, generally goosenecks hinged on the structure of the aircraft, around a pivoting axis shifted inwardly in the gear bay with respect to the panel.

Goosenecks are generally distributed over the length of the hatch and secured, on the one hand, on the hatch and, on the other hand, on the structure of the aircraft.

Depending on the case, at least one gooseneck is connected, by means of a connecting rod, to the structure of the aircraft. Alternatively, the connecting rods may be secured to the hatches by other types of platings.

This connecting rod allows performing a rotational movement of the hatch with respect to the fairing of the aircraft. According to the forms, there may also exist a system of intermediate bell-cranks aiming to limit the load along the longitudinal direction of the aircraft and allowing reducing the size of the platings along this direction.

Thus, during the deployment of the landing gear, the pivoting of the hatch towards the outside of the fuselage is obtained by means of the connecting rod and gooseneck hinges.

While the front hatches are generally displaced by means of at least one actuator (they open before the deployment of the gear), each secondary hatch is connected to the landing gear, for example by means of a connecting rod secured, on the one hand, on the landing gear (for example on the gear leg or on a hinge triangle of the gear) and, on the other hand, on the hatch.

This connecting rod allows maneuvering the hatch directly according to the movements of the landing gear. Thus, during the retracting of the landing gear, the actual fact that the landing gear ascends into the gear bay provides the closing of the hatch. The same can be said for the deployment of the gear and the opening of the hatches. Alternatively, it can also be considered to use a hinge triangle on the gear leg instead of the connecting rod(s).

More particularly, while the gear is deploying, the latter turns about an axis (forming the hinge triangle), causing a movement of the connecting rod which pushes the hatch to its open position.

Such a configuration hence allows controlling the deployment of the landing gear and the opening of the hatch at the same time.

In order to preserve the aerodynamics of the fuselage of the aircraft, the arrangement of the pivoting axis of the landing gear is achieved inside the gear bay. As mentioned before, the front hatches close up after having left the landing gear pass in order to reduce aerodynamic disruptions. Due to the passage of the gear leg, it is difficult and sometimes not possible to close the rear hatches again, thereby causing significant aerodynamic disruptions along the fuselage of the aircraft.

For these aerodynamic reasons, the secondary hatches have a reduced surface and opening which just allow the deployment of the landing gear. The front hatches should allow the passage of the landing gear wheels and are by comparison relatively wider.

A four hatch system generally does not comprise a main leg fairing.

In the case of a four hatch system, there are generally two rear hatches, or secondary hatches, and two front hatches, or main hatches, placed side by side.

The rear hatches may open in several ways.

As described above, the hatches may generally open laterally by pivoting.

Various hatch opening systems are described in Patent Documents: FR 2 911 321, FR 2 922 519, FR 2 886 620, US 2009/0159743 and U.S. Pat. No. 7,458,542.

French Patent FR 2 886 620 describes a system in which the hatches open laterally on either side of the fuselage, by pivoting. The rear hatches are fastened to the landing gear, by means of a rocker arm. This system is more particularly intended for large planes, of the A380 type, having a vast gear bay allowing housing therein the hinge system and the additional connecting rod. Such a system is difficult to implement on gear bays of smaller aircrafts.

U.S. Patent Publication US 2009/0159743 also describes a hatch system (five hatch system) with a lateral opening and by pivoting, including for the main leg fairing.

U.S. Pat. No. 7,458,542 describes an opening and closing system in which the front hatches have a double rotational movement, of tilt-and-turn type, such as to adopt an intermediate position in which they serve as aerodynamic cowling upstream of the deployed gear.

French Patent FR 2 922 519 describes a hatch system for gear bay animated by a lateral circular translational movement by means of deformable parallelogram type hinge. A gooseneck provides the detachment of the hatch and the lateral displacement thereof, the deformable parallelogram maintaining the orientation thereof substantially horizontal.

It is worth noting that the driving of these hatches is not carried out by means of the gear leg but by means of independent control means of cylinder type actuating a dedicated gooseneck type hinge.

At the start of its opening movement as well as at the end of closing, the lever arm exerted by this cylinder is extremely reduced, thus making the cylinder able to develop an even more important power and to be dimensioned accordingly. The hinges must also be dimensioned accordingly, thus translating by an unwanted increase of their size, bulk and mass.

It is also worth noting that the deformable parallelogram is constructed from a transversal hinge axis of the landing gear leg, thereby inducing positioning constraints of the hatch hinge system.

As for French Patent FR 2 911 321, it aims some aircrafts, particularly transport aircrafts intended for transporting cargo, in which there are certain constraints as regards the positioning of the floor.

French Patent FR 2 911 321 mentioned above describes a system for opening and closing a landing gear bay including at least one secondary hatch opening not laterally but longitudinally, so as to be in the direction of flow of the fluids. The hatch is further animated by a circular translation movement maintaining it substantially parallel to the fairing of the aircraft and to the flow of the fluid.

The hinge of the hatch is carried out by means of a gooseneck hinge rotatably secured, on the one hand, to the fairing, a stationary part of the aircraft, and on the other hand, to the hatch.

The driving of the hatch is associated to the landing gear leg and is carried out by means of a drive rod stiffly mounted on said gear leg but pivotally mounted on the hatch.

The stationary characteristic of the drive rod allows providing the translational guiding of the hatch and the maintaining thereof in a plane which is substantially parallel to the lines of the aircraft.

However, we have discovered that such a drive architecture is relatively stiff and not adaptable.

SUMMARY

The present disclosure provides a system for opening and closing at least one hatch of a landing gear bay of an aircraft, between a closing position in which said hatch is intended to allow at least in part the closing of the gear bay and provide an at least partial continuity with an outer wall of the aircraft, and an opening position in which the hatch opens the gear bay and is displaced along a substantially longitudinal direction of said aircraft, said opening and closing system being characterized in that it comprises:

at least one proximal guide rod having a first end that can be pivotally fastened, about a transversal direction of the aircraft, to the hatch and a second end that can be pivotally fastened, about a transversal direction of the aircraft, to an internal stationary structure of the gear bay;

at least one distal guide rod having a first end that can be pivotally fastened, about a transversal direction of the aircraft, to the hatch and a second end that can be pivotally fastened, about a transversal direction of the aircraft, to an internal stationary structure of the gear bay;

the proximal guide rod and the distal guide rod being arranged in such a manner as to form a deformable parallelogram type hinge; and at least one drive rod and having a first end that can be hingeably fastened to the hatch and a second end that can be hingeably fastened to a landing gear leg.

Adjectives proximal and distal are used with respect to the landing gear leg. The proximal rod is closest to the leg (located substantially towards the center of the gear bay) whereas the distal rod is the farthest from the leg (and located substantially at an edge of the gear bay).

Thus, thanks to a system according to the present disclosure, the advantages of a hatch which opens along a substantially longitudinal direction are kept, while forces are properly managed.

According to the present disclosure, the guiding of the hatch in its circular translational movement is distinct from its drive and each of the pieces may be dimensioned in a desired manner based on the function it fulfills.

This allows in particular using lighter and thereby cheaper guide rods. In the event of tearing, they may also be replaced independently from the drive rod of the hatch.

It is also worth noting that the guide rods hence work in traction and no longer in propulsion. It is also worth noting that the rods are located substantially in the direction of the applied forces, thus reducing any parasitic compression force and in particular the lateral forces liable to cause a premature fatigue of the system. The dimensioning of the elements may thus be reduced accordingly.

Furthermore, the forces applied to the hatch by the drive rod are thus substantially constant throughout the movement thereof and whatever the position it may take.

The opening and closing system according to the present application is also more easily suited to many types of landing gear bays.

According to one form, the distal guide rod is of gooseneck type. Such a rod allows providing in particular a slight initial deformation of the hinge parallelogram allowing a detachment of the hatch at the start of opening.

According to a variant, the system comprises several distal guide rods and/or several proximal guide rods, of which the pivoting fastening points are coaxial along a transversal direction of the aircraft.

Advantageously, the several rods are connected to each other, in particular by a connecting spider. It may also be possible to use a panel connection (including for example a honeycomb structure and carbon fibers), or a tube-based connection, in particular carbon or aluminum tubes.

Advantageously, the drive rod is fastened to the gear leg and/or to the hatch by a ball joint connection.

Alternatively or in a complementary manner, the drive rod is fastened to the gear leg and/or to the hatch by a pivoting connection, about a substantially transversal direction of the aircraft.

Advantageously, the system comprises at least one means for centering and positioning the hatch in closed position.

In an advantageous manner, the system comprises at least a stop able to come in contact, in particularly in point contact, with the hatch when the latter is in closed position.

The present disclosure also relates to a landing gear bay comprising at least one hatch moveably mounted between a closing position of the bay and an opening position, characterized in that the hatch is hinged using an opening and closing system according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
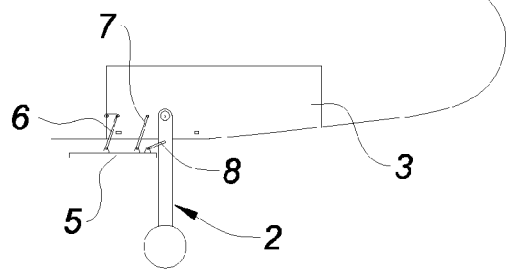
FIG. 1 is a schematic side representation of a front part of an aircraft equipped with a landing gear able to be housed in a gear bay having a rear hatch equipped with an opening and closing system according to the present disclosure (gear out—hatch open)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As explained before, the present application provides an opening and closing system of a landing gear bay hatch of an aircraft 1, and also a gear bay including such a system.

As represented on FIG. 1, the aircraft 1 comprises a front landing gear including a set of wheels (not referenced) mounted at one end of a gear leg 2.

In flight, when the landing gear is not used, it is retracted inside a suitable housing located in the fuselage or inside a fairing of the aircraft 1 and called landing gear bay 3.

In order to allow the deployment thereof the gear leg 2 is pivotally mounted on a stationary structure of the aircraft.

To provide the aerodynamic profile of the fuselage in flight, the gear bay 3 is closed by a set of hatches comprising two front hatches (not represented) and one rear hatch 5.

The front hatches are intended to allow the passage of the wheels and a low part of the leg 2 and are closed over after the deployment of the gear. They open laterally by pivoting and are mounted on gooseneck type hinges distributed longitudinally.

The rear hatch 5 is intended to allow the passage of the upper part of the leg 2 of the gear and, in accordance with the present application, opens longitudinally towards the rear of the aircraft.

In accordance with the present application, the rear hatch 5 is associated with an opening and closing system comprising:

a pair of proximal guide rods 7 (in this instance upstream with respect to the aircraft and direction of advance) having a first end which is pivotally fastened, about a transversal direction of the aircraft, to the hatch 5 and a second end which is pivotally fastened, about a transversal direction of the aircraft 1, to an internal stationary structure of the gear bay 3;

a pair of distal guide rods 6 having a first end which is pivotally fastened, about a transversal direction of the aircraft, to the hatch 5 and a second end which is pivotally fastened, about a transversal direction of the aircraft 1, to an internal stationary structure of the gear bay 3;

the proximal guide rods 7 forming with the distal guide rods 6 a deformable parallelogram type hinge; and a pair of drive rods 8 each having a first end hingeably fastened to the hatch 5 and a second end hingeably fastened to the leg 2 of the landing gear.

More particularly, the distal guide rods 6 are of gooseneck type.

The rods 6, 7, 8 are secured by means of suitable securing plates.

In addition, the paired rods 6, 7, 8 have pivoting fastening points which are coaxial along a transversal direction of the aircraft. Furthermore, the distal gooseneck rods 6 are secured to each other by a connecting spider so as to form a cradle of the hatch 5.

The drive rods 8 are fastened, on the one hand, to the hatch 5 by a pivoting connection about a substantially transversal direction of the aircraft, and on the other hand, to the gear leg 2 by a ball joint connection.

The operating of the opening and closing system of the hatch will now be described with reference to FIGS. 2 and 3.

Figure 2:
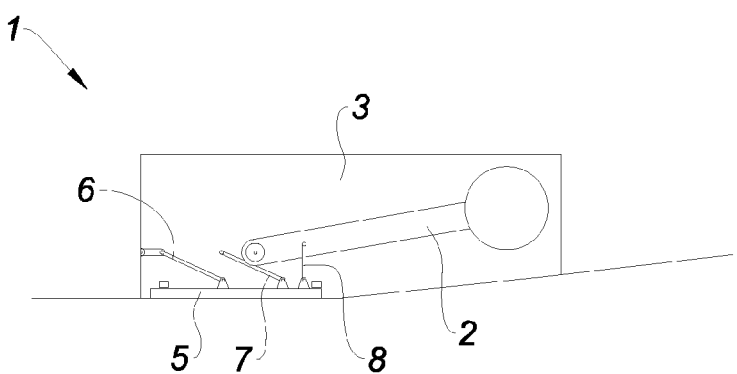
FIGS. 2 and 3 are partial cross-sectional views of the gear bay of FIG. 1 and of the hinge system of the rear hatch at different stages of its opening.
Figure 3:
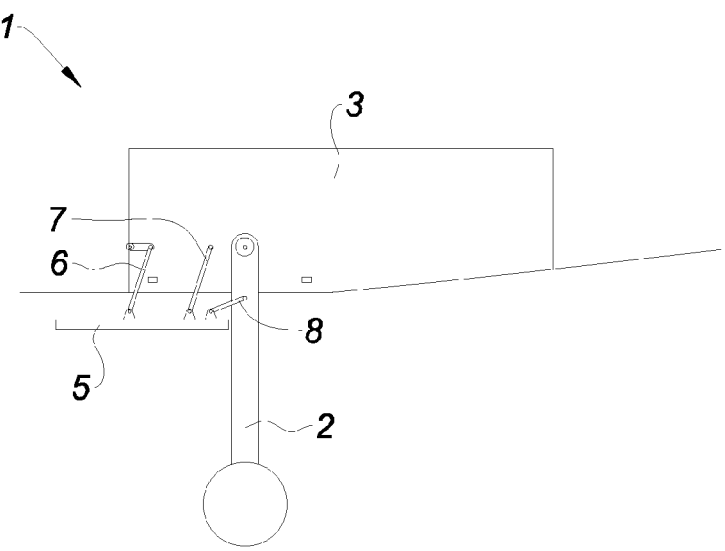
Figure 4:
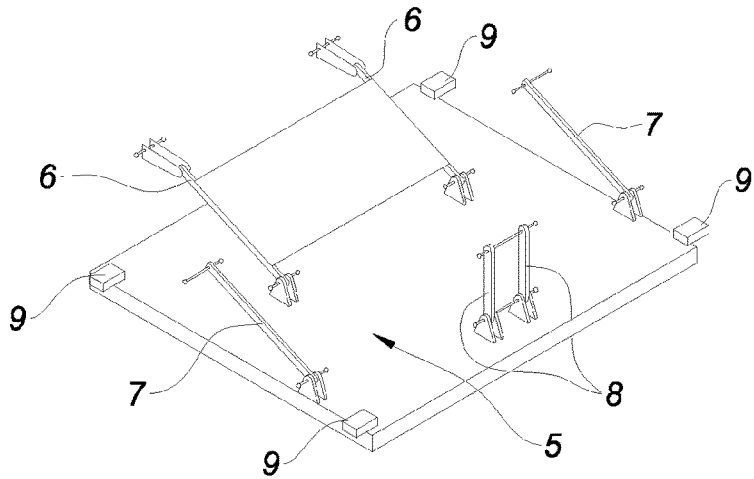
FIG. 4 is a perspective representation of the rear hatch of FIGS. 1 to 3 with its opening and closing system according to the present disclosure.
Figure 5:
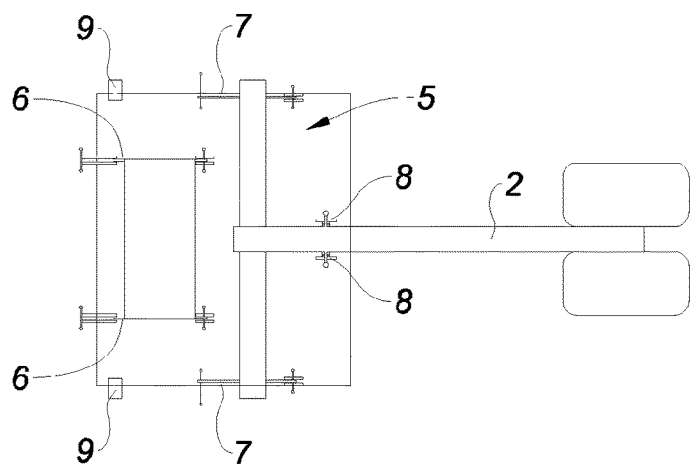
FIG. 5 is an overall representation of the hatches equipping the landing gear bay.
Figure 6:
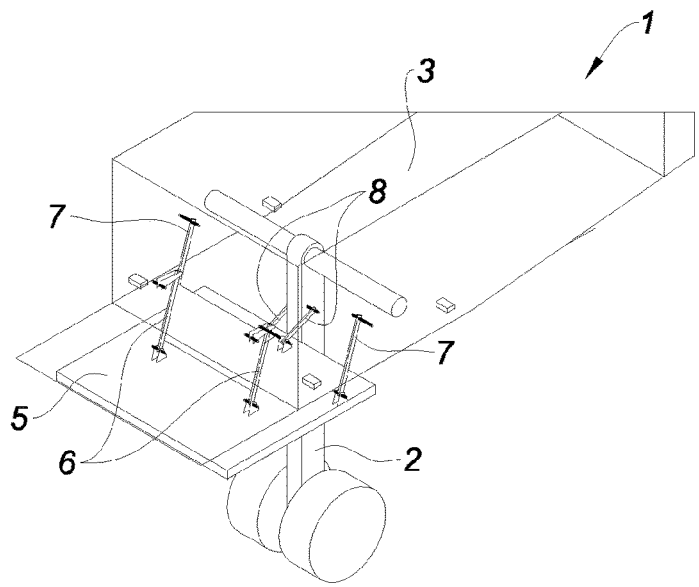
FIG. 6 is a perspective schematic representation of the rear hatch and its opening and closing system in open position.

In initial closed position, such as shown on FIG. 2, the hatch 5 is held to the landing gear and more particularly retained by the gear leg 2 via the drive rods 8.

In an advantageous manner, the drive rods 8 are substantially perpendicular to the plane of the hatch 5 so as to reduce the opening angle to a desired degree, and thereby limit parasitic forces.

The first opening phase of the hatch 5 consists in slightly detaching the hatch 5 from the opening of the bay to make it escape from the joints and the structure. It consists of a slight initial vertical translational movement allowed in particular by the goosenecks.

The drive rods 8 provide synchronizing the opening of the hatch 5 with the deployment of the gear leg 2.

Thanks to these distal 6 and proximal 7 rods forming a deformable parallelogram assembly, the hatch 5 follows a circular translational movement and substantially maintains its horizontality so as to limit aerodynamic forces.

In open position (FIG. 3), the hatch 5 is located behind the gear and the leg 2 in static equilibrium with the distal and proximal guide rods 6, 7 as well as with the drive rods 8.

The geometry of the assembly is improved for opening the static load triangle to a maximum.

The hatch 5 is protected behind the landing gear in a quasi horizontal position.

The assembly may also comprise stops for positioning and setting the hatch 5 in closed position as well as unlockable means for retaining the hatch.

The guide 6, 7 and drive 8 rods are elements for the movement of the hatch 5 and are thereby designed in static and dynamic with respect to the load cases resulting from the opening and closing of the hatch 5.

The drive rods 8 as well as the stops 9 for receiving and positioning the hatch 5 are elements which are for holding the hatch in position during the flight phases and are designed for fatigue with cyclic forces.

Thanks to the present disclosure, the drive and guide functions of the hatch 5 are thus dissociated. The drive rods 8 are the only elements participating in both functions.

Dimensioning the elements is made much easier and the different pieces may be made lighter.

In the case of rear hatches, it is easier to implement only one hatch instead of the two usual hatches (the gear bay thus including three hatches in all: two front hatches and one rear hatch).

Thus, thanks to a system according to the present application, it has been possible to improve distal guide rods 6 (goosenecks).

With respect to a gear bay system with 5 typical hatches, the system according to the present application may allow significantly lightening of the assembly.

The system is also more easily suited to any type of aircraft and gear bay.

What is claimed is:

1. A system for opening and closing at least one hatch of a landing gear bay of an aircraft, between a closing position in which said at least one hatch is configured to allow at least in part the closing of the landing gear bay and provide at least partial continuity with an outer wall of the aircraft, and an opening position in which said at least one hatch opens the landing gear bay and is displaced along a substantially longitudinal direction of the aircraft, said opening and closing system comprising:
   - at least one proximal guide rod having a first end that is pivotally fastened, about a transversal direction of the aircraft, to said at least one hatch, and a second end that is pivotally fastened, about the transversal direction of the aircraft, to an internal stationary structure of the landing gear bay;
   - at least one distal guide rod having a first end that is pivotally fastened, about the transversal direction of the aircraft, to said at least one hatch, and a second end that is pivotally fastened, about the transversal direction of the aircraft, to an internal stationary structure of the landing gear bay, said at least one proximal guide rod and distal guide rod being arranged to form a deformable parallelogram type hinge; and
   - at least one drive rod having a first end that is hingeably fastened to said at least one hatch, and a second end that is hingeably fastened to a landing gear leg.

2. The system according to claim 1, wherein said at least one distal guide rod is of gooseneck type.

3. The system according to claim 1, wherein the system comprises several distal guide rods and/or several proximal guide rods, and pivoting fastening points are coaxial along the transversal direction of the aircraft.

4. The system according to claim 3, wherein the several distal guide rods are connected to each other.

5. The system according to claim 4, the several distal guide rods are connected to each other by a connecting spider.

6. The system according to claim 1, wherein said at least one drive rod is fastened to the landing gear leg and/or to said at least one hatch by a ball joint connection.

7. The system according to claim 1, wherein said at least one drive rod is fastened to the landing gear leg and/or to said at least one hatch by a pivoting connection, about the transversal direction of the aircraft.

8. The system according to claim 1, wherein the system comprises at least one means for centering and positioning said at least one hatch in a closed position.

9. The system according to claim 1, wherein the system comprises at least one stop configured to come in contact with said at least one hatch in a closed position.

10. The system according to claim 1, wherein the system comprises at least one stop configured to come in a point contact with said at least one hatch in a closed position.

11. A landing gear bay comprising said at least one hatch moveably mounted between the closing position of the landing gear bay and the opening position, wherein said at least one hatch is hinged using the opening and closing system according to claim 1.

* * * * *